INVENTOR
JAMES F. LEE

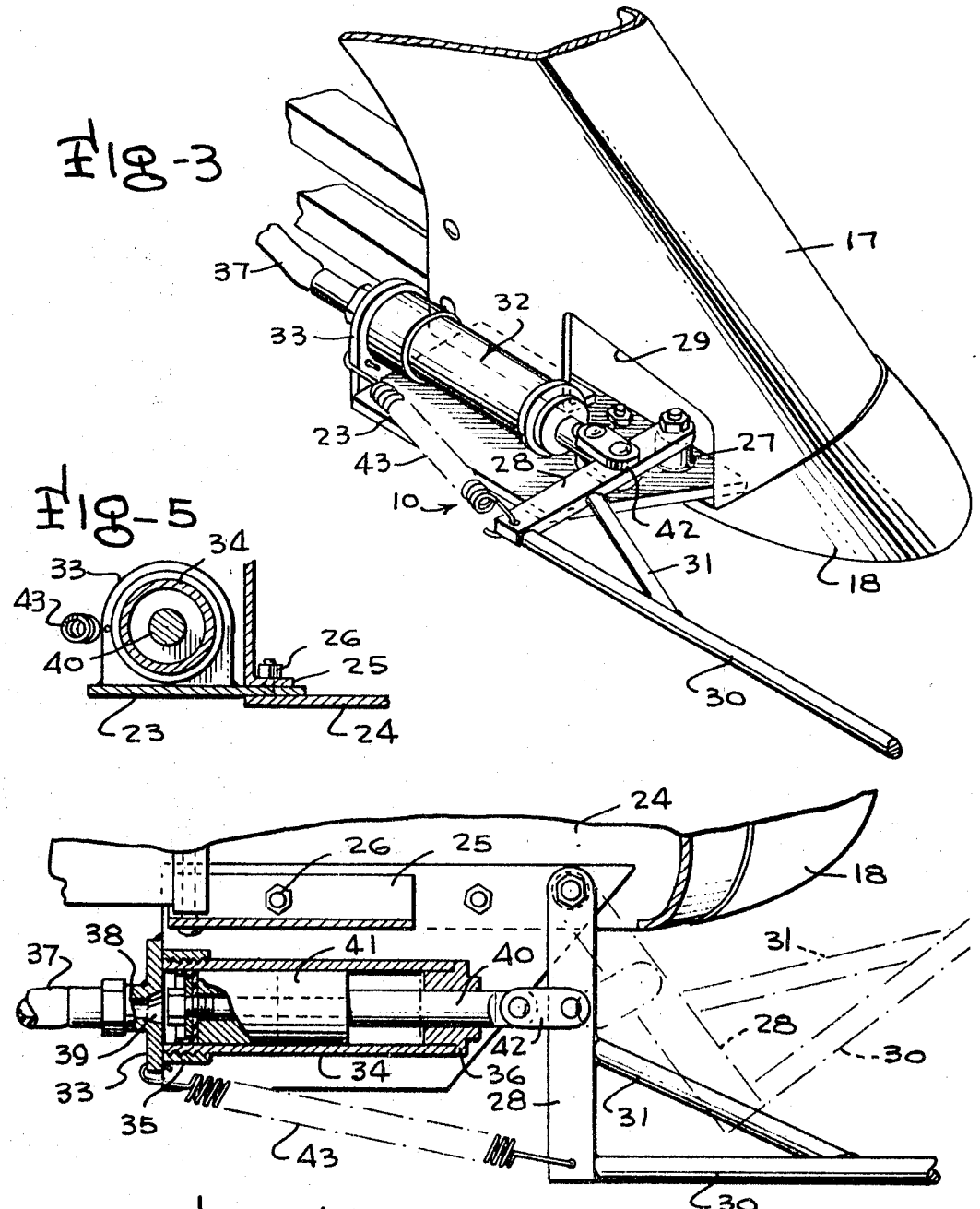

United States Patent Office 3,458,980
Patented Aug. 5, 1969

3,458,980
EXTRACTING UNIT FOR WEEDS, GRASS AND THE LIKE
James F. Lee, Rte. 4, Box 119, Darlington, S.C. 29532
Filed Jan. 24, 1967, Ser. No. 611,348
Int. Cl. A01d 45/18
U.S. Cl. 56—28                                    10 Claims

ABSTRACT OF THE DISCLOSURE

A vegetation extracting unit for a picking machine comprising a support means mounted on the machine, a vegetation engaging means pivotally mounted on the support means for movement in a horizontal plane, means for biasing the engaging means laterally away from the path of the picking mechanism of the machine, in an inoperative position, and means for moving the vegetation engaging means toward the path of the picking mechanism, to a predetermined operative position ahead of the picking mechanism and adjacent the row of planted crops to be picked.

Background of the invention

This invention relates to a grass and weed extracting unit, and more particularly to a grass and weed extracting unit for a machine adapted to pick a row of planted crops such as cotton and the like.

In raising various types of crops, it has been found that grass, weeds and other kinds of undesirable vegetation tend to grow between and around the planted crops. Often, when mechanical picking machines are utilized for picking the crop, various types of indigenous growth such as grass, weeds and other vegetation enter the picking machine with the plants to be picked, resulting in interference with the operation of the picking mechanism. In addition, such vegetation often is picked along with the crop and becomes mixed with the picked plant, which is undesirable.

Particularly in the production of cotton, the presence of indigenous growth between and around the cotton plants is a major problem in the harvesting of the plants. Usually, mechanical picking machines are employed for picking the cotton from the plants. If grass, weeds or other types of vegetation is harvested with the cotton, it is difficult to separate such vegetation from the cotton, since the vegetation adheres to the cotton fibers and is difficult to separate therefrom.

Summary of the invention

The principal purpose of the present invention is to provide a novel grass and weed extracting unit.

Another object of this invention is to provide a novel grass and weed extracting unit for a machine adapted to pick a row of planted crops.

A further object of this invention is to provide a novel grass and weed extracting unit for a mechanical cotton picking machine adapted to pick a row of cotton plants.

A still further object of this invention is to provide a novel grass and weed extracting unit for a plant picking machine which effectively suppresses undesirable vegetation in advance of the picking machine, thereby preventing entry of such vegetation into the picking machines.

Another object of the present invention is to provide a novel grass and weed extracting unit for a cotton picking machine adapted to pick a row of planted cotton, which effectively suppresses the vegetation in advance of the cotton picking mechanism of the machine, thereby preventing entry of the vegetation into the picking mechanism along with the cotton plants.

A further object of the present invention is to provide a novel grass and weed extracting unit for a cotton picking machine, which can be mounted easily on conventional cotton picking machines.

A still further object of the present invention is to provide a novel grass and weed extracting unit for a machine adapted to pick a row of planted crops, which is movable into an inoperative position to permit the machine to be turned at the end of a row of plants without interfering with any of the plants.

Another object of the present invention is to provide a novel grass and weed extracting unit for a machine adapted to pick a row of plants, which is relatively simple in construction, inexpensive to manufacture and easy to install.

Other objects of the invention will become more apparent to those persons skilled in the art, from the following description of a practical embodiment of the invention, when taken in conjunction with the drawings which accompany, and form a part of, this specification.

Brief description of the drawings

FIGURE 3 is an enlarged perspective view of the embodiment illustrated in FIGURES 1 and 2.

FIGURE 4 is an enlarged cross-sectional view taken along line 4—4 in FIGURE 2.

FIGURE 5 is an enlarged cross-sectional view taken along line 5—5 in FIGURE 2.

Description of the preferred embodiment

Figure 1:
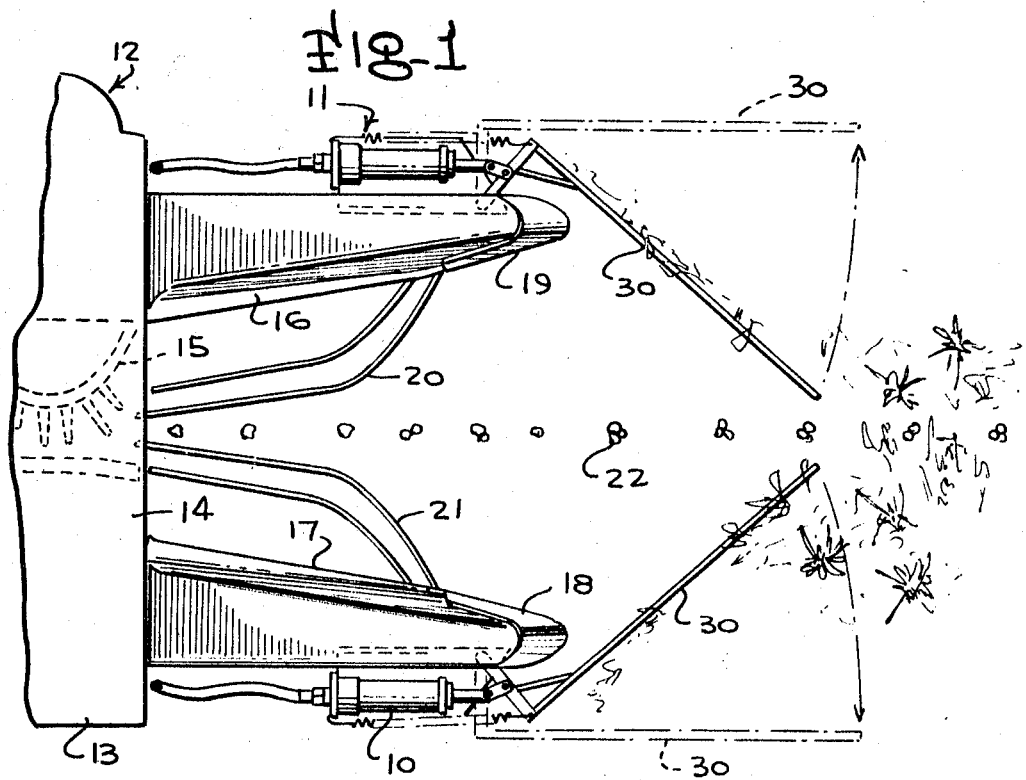
FIGURE 1 is a top plan view of an embodiment of the invention shown mounted on a conventional cotton picking machine.
Figure 2:
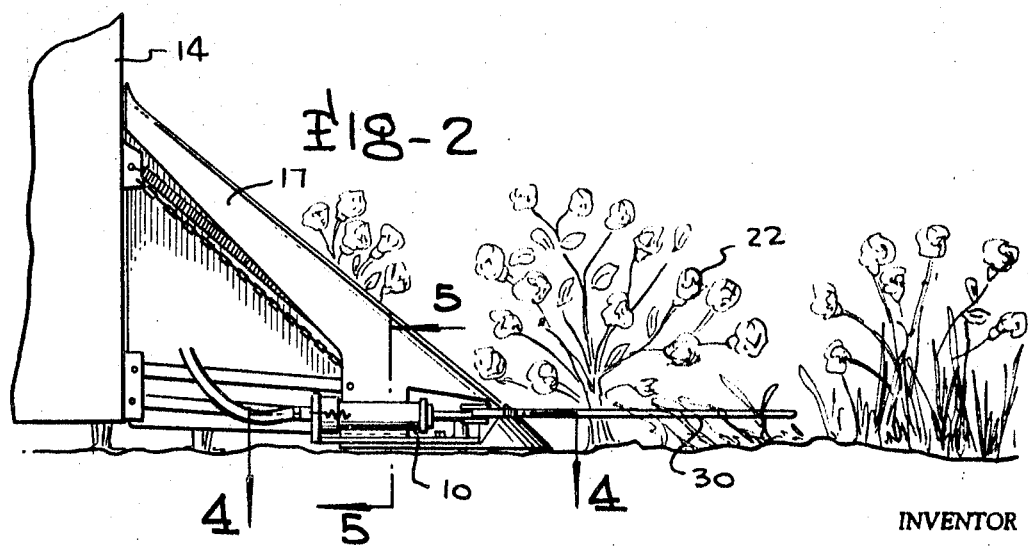
FIGURE 2 is a side elevational view of the invention and the cotton picking machine illustrated in FIGURE 1.

Referring to the drawings, there is illustrated the preferred embodiment of the invention. FIGURE 1 specifically illustrates grass and weed extracting units 10 and 11 mounted on a conventional cotton picking machine 12. The picking machine includes a main body portion 13 having a longitudinal opening 14 in which there is provided a picking mechanism 15. Spaced transversely and projecting forwardly from the main body portion 13 of the picking machine, is a pair of gathering members 16 and 17 having shoe members 18 and 19 rigidly secured on the lower forward ends thereof. Secured on the inner sides of the gathering members 16 and 17, and extending rearwardly toward the opening 14 in the machine, are conventional guide members 20 and 21 which are adapted to guide the row of cotton plants 22 into the opening 14 and in contact with the picking mechanism 15. The extracting units 10 and 11 are identical in construction and operation, each being mounted on the outer front side of its associated gathering member. For the purpose of simplicity and clarity, only the construction and operation of the extracting unit 10 will be described, and it will be understood that the construction and operation of the extracting unit 11 is the same.

As best seen in FIGURES 3 through 5, the extracting unit 10 includes a substantially horizontal support bracket 23, having its inner side rigidly secured to a bottom plate member 24 and an inwardly projecting flange 25 of the gathering member 17, by means of suitable nut and bolt assemblies 26. Disposed on the inner forward portion of the support bracket 23 is a mounting post 27, having an actuating arm 28 pivotally secured on the upper end thereof. The actuating arm 28 projects laterally through an opening 29 in the side wall of the gathering member 17, and is adapted to pivot in a substantially horizontal plane adjacent ground level. A forwardly extending, rigid engaging arm member 30 is rigidly secured to the end of the actuating arm 28. The engaging arm 30 is elongated and disposed substantially perpendicular to the actuating arm 28. A strut member 31 interconnecting the actuating and engaging arm members is provided to reinforce the engaging arm 30. As best seen in FIGURE 4, the arm members 28 and 30 are adapted to pivot about the post member 27 in a substantially horizontal plane adjacent ground level.

The actuating arm member 28 is pivoted by means of a hydraulic cylinder assembly 32 which is mounted on an upstanding bracket member 33 disposed on the rearward end of the support bracket 23. The hydraulic cylinder assembly includes a cylinder 34, having its rearward end threaded into a mounting fitting 35 secured to the upstanding bracket member 33, and having its forward end closed by a plate member 36.

A fluid under pressure is supplied to the cylinder by means of a fluid supply line 37 connected to a fitting 38 which communicates through an opening 39 in the upstanding bracket 33 with the interior of the cylinder 34. Extending through the front plate 36 into the cylinder 34 is an actuating rod 40, having a piston head member 41 mounted on one end thereof within the cylinder 34 and a linking member 42 mounted on the forward end thereof interconnecting the rod member 40 and the actuating arm member 28.

A coil spring 43 interconnecting the upstanding bracket member 33 and the outer end of the actuating arm 28 is provided for biasing the actuating arm into the position as illustrated by the solid lines in FIGURE 4. It will be appreciated that by admitting fluid under pressure into the cylinder 34, the actuating arm can be pivoted toward the position illustrated by the broken lines in FIGURE 4, against the restraining force of the spring member 43.

The extracting units, as described, are intended to be utilized for extracting or suppressing grass, weeds and other types of undesirable vegetation during a harvesting operation. As the cotton picking machine is driven along a row of cotton plants 22, as illustrated in FIGURE 1, so that the plants are guided by the members 20 and 21 into the opening 14 and the picking mechanism 15, the extracting units 10 and 11 can be utilized for effectively extracting and suppressing indigenous growth disposed adjacent the cotton plants. To accomplish this, fluid under pressure is supplied to the extracting units so that the engaging arms 30 thereof are moved to their operating positions, as illustrated by the solid lines in FIGURE 1. It will be noted that the free ends of the arm members 30 are spaced apart a sufficient distance to permit the row of cotton plants to pass therebetween, while the elongated arm members 30 engages the indigenous growth about the cotton plants and suppress the same, thereby preventing them from clinging to the cotton plants and being admitted between the guide members 20 and 21 into the opening 14, and being fed to the picking mechanism 15.

When the machine has reached the end of a row of plants and it is desired to turn the machine, the engaging arm members 30 may be moved to their inoperative positions, as illustrated by the broken lines in FIGURE 1, simply by removing the supply of fluid under pressure to the extracting units and permitting the coil springs 43 to pivot the actuating arm members 28 rearwardly to the positions as illustrated by the broken lines in FIGURE 1.

The cylinder assemblies of the extracting units can be actuated by any conventional source of fluid under pressure on the picking machine. In addition, the various components of the extracting units can be constructed of any suitable materials having sufficient strength characteristics to provide adequate wear and long use.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A grass and weed extracting unit for a machine adapted to pick a row of planted crops comprising at least one support means mounted on said machine, a grass and weed engaging means pivotally mounted on said support means for movement in a substantially horizontal plane, means for biasing said engaging means laterally away from the path of the picking mechanism of said machine along said row of planted crops, in an inoperative position, and means for moving said grass and weed engaging means toward said path of said picking mechanism, to a predetermined operative position ahead of said picking mechanism and adjacent said row of planted crops.

2. A grass and weed extracting unit according to claim 1, wherein said grass and weed engaging means comprises a rigid elongated arm member.

3. A grass and weed extracting unit according to claim 1, wherein said biasing means comprises a spring member.

4. A grass and weed extracting unit according to claim 1, wherein said moving means comprises a fluid actuated cylinder assembly.

5. A grass and weed extracting unit according to claim 1, wherein said grass and weed engaging means comprises a rigid elongated arm member, said biasing means comprises a spring member and said moving means comprises a fluid actuated cylinder assembly.

6. A grass and weed extracting unit according to claim 1, wherein said engaging means comprises a laterally projecting actuating arm pivotally connected to said support means and a forwardly projecting, rigid elongated extension arm secured to said actuating arm.

7. A grass and weed extracting unit according to claim 6, wherein said actuating and extension arms are movable in a plane disposed adjacent ground level.

8. A grass and weed extracting unit according to claim 6, wherein said biasing means comprises a coil spring.

9. A grass and weed extracting unit according to claim 6, wherein said moving means comprises a hydraulic cylinder assembly.

10. A grass and weed extracting unit according to claim 6, wherein said actuating and extension arms are movable in a plane disposed adjacent ground level, said biasing means comprises a coil spring interconnecting said support means and said actuating arm and said moving means comprises a hydraulic cylinder assembly operatively interconnecting said support means and said actuating arm.

References Cited

UNITED STATES PATENTS

| 2,821,057 | 1/1958 | Campbell et al. | 56—28 |
| 2,999,349 | 9/1961 | Nichols | 56—28 |
| 3,143,840 | 8/1964 | Weatherall | 56—28 |

RUSSELL R. KINSEY, Primary Examiner